United States Patent [19]

Banks et al.

[11] Patent Number: 5,605,639

[45] Date of Patent: Feb. 25, 1997

[54] METHOD OF PRODUCING DIFFUSION HOLES IN TURBINE COMPONENTS BY A MULTIPLE PIECE ELECTRODE

[75] Inventors: John H. Banks, Amston; Roger A. Poggio, Meriden, both of Conn.

[73] Assignee: United Technologies Corporation, Hartford, Conn.

[21] Appl. No.: 171,293

[22] Filed: Dec. 21, 1993

[51] Int. Cl.⁶ .............................. B23H 1/00; B23H 9/14
[52] U.S. Cl. .............................. 219/69.17; 219/69.15
[58] Field of Search ................... 219/69.14, 69.15, 219/69.17, 69.2; 204/129.55, 129.6, 224 M; 205/649, 665, 670

[56] References Cited

U.S. PATENT DOCUMENTS

| | | | |
|---|---|---|---|
| 3,590,204 | 6/1971 | O'Connor | 219/69.2 |
| 3,604,884 | 9/1971 | Olsson | 219/69.16 |
| 3,767,555 | 10/1973 | Shaw | 204/224 M |
| 3,793,170 | 2/1974 | Andrews | 204/129.6 |
| 3,801,489 | 4/1974 | Samson | 204/129.55 |
| 3,803,015 | 4/1974 | Andrews | 204/224 M |
| 3,825,984 | 7/1974 | Linko et al. | 29/156.8 H |
| 3,842,480 | 10/1974 | Mikulski | 204/224 M |
| 3,875,038 | 1/1975 | McKinney et al. | |
| 3,981,786 | 9/1976 | Andrews | 204/224 M |
| 4,197,443 | 4/1980 | Sidenstick | 219/69.15 |
| 4,373,127 | 2/1983 | Haskett et al. | 219/69.15 |
| 4,441,004 | 4/1984 | Inoue | 219/69.15 |
| 4,469,654 | 9/1984 | Haskett et al. | 264/62 |
| 4,721,838 | 1/1988 | Abdukarimov et al. | 219/69.15 |
| 4,819,325 | 4/1989 | Cross et al. | 29/825 |
| 5,023,422 | 6/1991 | Laughton et al. | 219/69.2 |
| 5,159,167 | 10/1992 | Chaikin et al. | 219/69.2 |
| 5,165,852 | 11/1992 | Lee et al. | 416/97 R |
| 5,177,336 | 1/1993 | Duffin | 219/69.17 |
| 5,357,073 | 10/1994 | Tominaga et al. | 219/69.15 |

FOREIGN PATENT DOCUMENTS

| | | | |
|---|---|---|---|
| 0173749 | 3/1986 | European Pat. Off. | |
| 0227581 | 7/1987 | European Pat. Off. | |
| 1269229 | 12/1961 | France | |
| 2180987 | 11/1973 | France | |
| 2403158 | 4/1979 | France | |
| 174934 | 7/1962 | U.S.S.R. | |
| 2177644 | 1/1987 | United Kingdom | |
| 2246975 | 2/1992 | United Kingdom | 219/69.15 |

OTHER PUBLICATIONS

Kahles, John F., "Machining; American Society for Metals", 1967, Metals Handbook, vol. 3, 8th Edition pp. 227–233.

Primary Examiner—Geoffrey S. Evans
Attorney, Agent, or Firm—Charles E. Sohl

[57] ABSTRACT

A method of forming diffusion holes in a super alloy article by electrical discharge machining by the steps of (a) inserting onto an electrical discharge machine a multiple piece electrode with at least one tooth with respectively at least one movable elongated rod wherein each rod is positioned through each tooth and secured to the tooth, and (b) advancing the multiple piece electrode during electrical discharge machining longitudinally into the super alloy article so that the rod forms a hole with a metering section in the super alloy article of about 0.010 inches in diameter at a depth in excess of about 0.250 inches and the tooth forms a diffused area, with an angle of about 10 degrees, at one end of the hole.

7 Claims, 2 Drawing Sheets

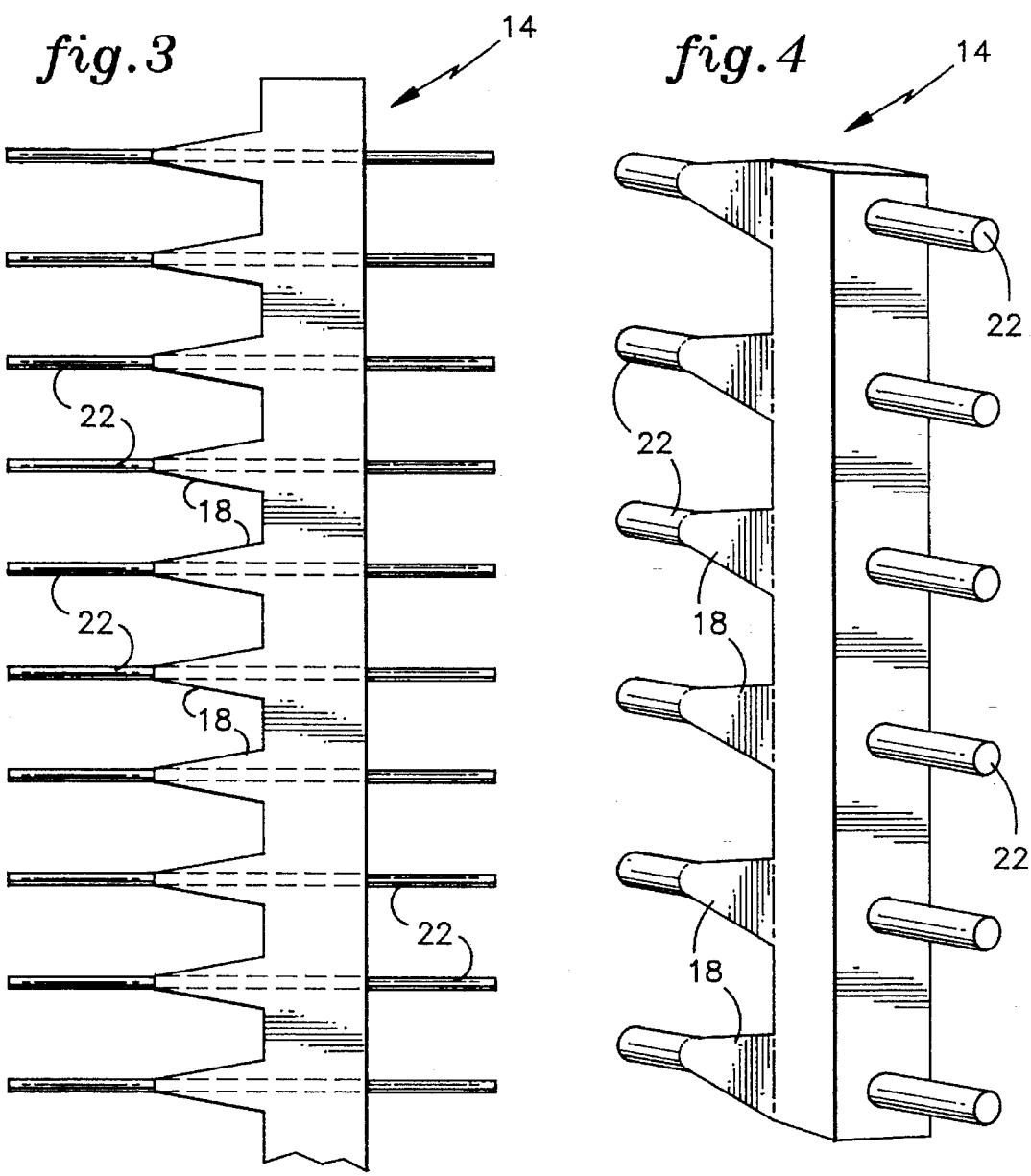
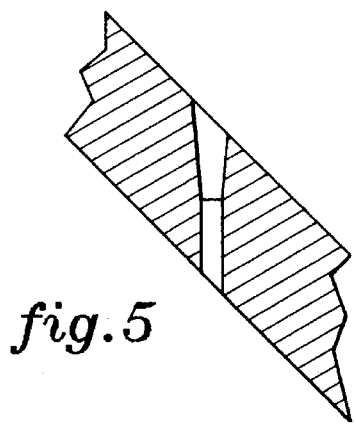

METHOD OF PRODUCING DIFFUSION HOLES IN TURBINE COMPONENTS BY A MULTIPLE PIECE ELECTRODE

TECHNICAL FIELD

The present invention relates generally to the production of shaped holes in articles, such as gas turbine engine components, and more particularly to an electrode for use in an electrical discharge machining (EDM) device.

BACKGROUND ART

Gas turbine engines operate at extremely high temperatures for increased efficiency. Stationary vanes, disposed between rings of moving blades within the turbine section of the engine direct and stabilize high temperature gas flow from one stage of moving blades to the next. Direct exposure to this high temperature gas, however, detrimentally affects the vanes and blades by causing component distortion and even melting in extreme cases.

Internal cooling techniques have been developed to keep the temperature of the blades and vanes within design limits while operating at high temperatures. For example, the outer surface of engine components are typically cooled with high pressure cooling air from the compressor section of the engine. Film cooling has proven to be an effective means of utilizing this cooling air. In this method, a layer of cool air is flowed between the high temperature gases and the external surfaces of the engine components. The layer of cooling air is formed by passing the cooling air through a series of small holes in the component which are formed in a predetermined pattern. The resulting film of air reduces component surface temperature thereby deterring component distortion. Engine efficiency is also increased because higher turbine inlet temperature ranges are possible.

It is well known in the art that film cooling effectiveness can be increased by using diffusion holes which have a conical portion and an enlarged opening at the surface of the component, as shown in FIG. 1. The shaping of the holes to diffuse air before it enters the boundary layer of the component broadens the spread of air downstream of the hole and thus, increases cooling effectiveness. In comparison, cylindrical shaped holes create a localized region downstream of the hole where cooling effectiveness is great and there is little spreading effect away from this region. Although high quality diffusion holes provide superior performance, they are both costly and difficult to form.

In the prior art, many attempts have been made to form cost effective, high quality cooling holes in gas turbine engine components. For example, laser drilling has been used to produce holes on the leading and trailing edges of vanes and blades. It is difficult, however, to produce shaped holes with this technique. This is a significant limitation because the geometry of the holes partially determines the effectiveness of cooling.

Electrochemical machining (ECM) is another option for producing diffusion holes. This process, however, requires high setup and tooling costs and has high capital equipment costs. In addition, the electrolyte in this process, typically an oxidant such as sodium nitrate or sodium chlorate, is a health and safety hazard and the process by-products are often classified as hazardous waste.

Another method, electrical discharge machining (EDM), can also be used to form shaped diffusion holes in engine components. EDM is a well known process for producing holes or other openings in metals. It uses current discharges to erode metal. For example, by pulsing a direct current between a positively charged work piece (anode) and an electrode (cathode), a spark discharge may be produced. The current occurs when the potential difference between the electrode and the work piece, which both contact a dielectric fluid, is great enough to breakdown the dielectric fluid and produce an electrically conductive channel. Upon application of a voltage, a current flow results with enough heat energy to melt and erode the work piece. This process has application in the machining of small, deep, odd-shaped holes which are cumbersome, if not impossible, to produce by other means.

An EDM method for producing diffusion holes in engine components uses a copper electrode which is manufactured in a three-dimensional shape by stamping and coining. The prior art one-piece electrode consists of at least one small diameter elongated end which produces the cooling air metering section. The elongated end is connected to a three-dimensional diffuser shaped portion which produces a diffuser area for the metering section. The electrode produces a similar shaped hole, with allowance for electrode overburn and EDM electrode erosion.

Although the above EDM method is successful, limitations exist. For example, copper electrodes have a significant length/depth limit and a significant lower diameter limit for the holes due to the low melting point of copper. The hole depth limit for the above described copper electrode is about 0.250 inches maximum at a minimum diameter limit of about 0.014 inches. These values are design norms based on production experience for a shaped copper electrode.

Accordingly, what is needed is an EDM electrode which can produce high quality, deeper shaped holes with smaller metering diameters than previously possible.

The objects of the present invention are to (1) provide an economical electrode for use in an EDM device for producing high quality, deeper diffusion holes with smaller diameters than previously possible; and (2) provide a cost efficient method for forming deep, smaller diameter diffusion holes in articles, such as gas turbine engine components, than previously possible.

These objects and other features and advantages of the invention will be apparent from the following disclosure and description of the Best Mode, read in conjunction with the drawings.

DISCLOSURE OF THE INVENTION

According to the present invention, a multiple piece electrode for use in an electrical discharge machining (EDM) device for producing diffusion holes in superalloys is disclosed. The electrode of the present invention comprises at least one three-dimensional shaped tooth to facilitate formation of a diffusion hole, and at least one movable rod portion which passes through the tooth. The shaped tooth may be made from a malleable conductive material such as copper or copper alloys. The shaped tooth may also be made from graphite, copper-tungsten, tungsten, gold, silver, tin, platinum, lead, zinc, iron, nickel, or brass. Preferably, the shaped tooth is copper. Any conventional means of making the shaped tooth, such as stamping and coining may be employed. The shaped tooth includes a hole therein for the rod.

The movable rod may be any material with a conductivity as high as that of tungsten and a melting point about as high as that of brass or higher. For example, the rod may be tungsten, copper-tungsten or brass. The rod may have a diameter between about 0.005 inches and about 0.030 inches. The rod may be a cylindrical solid structure or hollow structure. If the rod is hollow, a dielectric fluid may be passed through the rod to enhance formation of a deep hole by providing a constant flow of dielectric fluid through the hole.

The movable rod may be positioned in a passageway inside the shaped tooth. In this embodiment, the rod and shaped tooth may be held together by a mechanism such as an external clamping mechanism, or a securing mechanism attached to the processing equipment. An adhesive, such as epoxy, may also be used. Alternatively, the shaped tooth may be multiple pieced, wherein a clamping mechanism, such as a plurality of screws, may fasten the rod and tooth together. When the multiple piece electrode is advanced into the work piece, the rod causes an erosion which results in a deep, small diameter hole in the work piece and the shaped tooth causes an erosion which results in an enlarged opening at one end of the hole. Additionally, upon advancing the shaped tooth and rod into the work piece, the rod may be rotated during the EDM process if the rod and shaped moth are held together by an appropriate mechanism. Any conventional means of rotating the rod, such as a rotating adapter attached to the processing equipment, may be used. The combination of a hollow rod with internal dielectric fluid flow and a rotating adapter may further increase the achievable hole depth by causing dielectric flow.

Alternatively, the work piece may be electrically discharged machined first with a shaped tooth and then with a rod. An advantage of this sequence is the reduction of wear on the rod. The rod only erodes the work piece beyond the diffused hole previously formed by the shaped tooth. This sequence increases electrode alignment and essentially eliminates tool marks around the metering hole. Tool marks are usually created by misaligned metering sections caused by handling damage or thermally induced bending.

The present invention may also include a refeed system for the rods which positions the rods to a desired length. The refeed system includes an electrode length master which is positioned in front of an electrode. The refeed system slides the electrode to a desired length against the length master. The length master is removed and the EDM cycle then continues. In this application, the rods are positioned to a proper length and subsequently refed to compensate for electrode wear. Any conventional mechanism for advancing and extracting the rods in an EDM device may be used. Upon electrical discharge machining a diffused area with a tooth, a small diameter metering area may then be produced by advancing the rods into the work piece. This system allows for improved position tolerance and compensation for uneven electrode EDM wear.

BRIEF DESCRIPTION OF THE DRAWINGS

FIG. 3 is a side view of a "comb-like" structure of a multiple piece electrode of the present invention.

FIG. 4 is a perspective view of a "comb-like" structure of a multiple piece electrode of the present invention.

FIG. 5 is a schematic view of a diffused hole with an angle of about ten (10) degrees.

BEST MODE FOR CARRYING OUT THE INVENTION

By way of illustration which is meant to be exemplary rather than limiting, the present invention will be described by the electrical discharge machining (EDM) of diffusion holes in a hollow turbine blade. In as much as it is well known in the art to form the diffusion holes in gas turbine engine components by means of EDM, details of the process will not be described herein. Specific details can be found in U.S. Pat. No. 4,197,443 (Sidenstick) and in U.S. Pat. No. 3,604,884 (Olsson) which are incorporated herein by reference.

Figure 1:
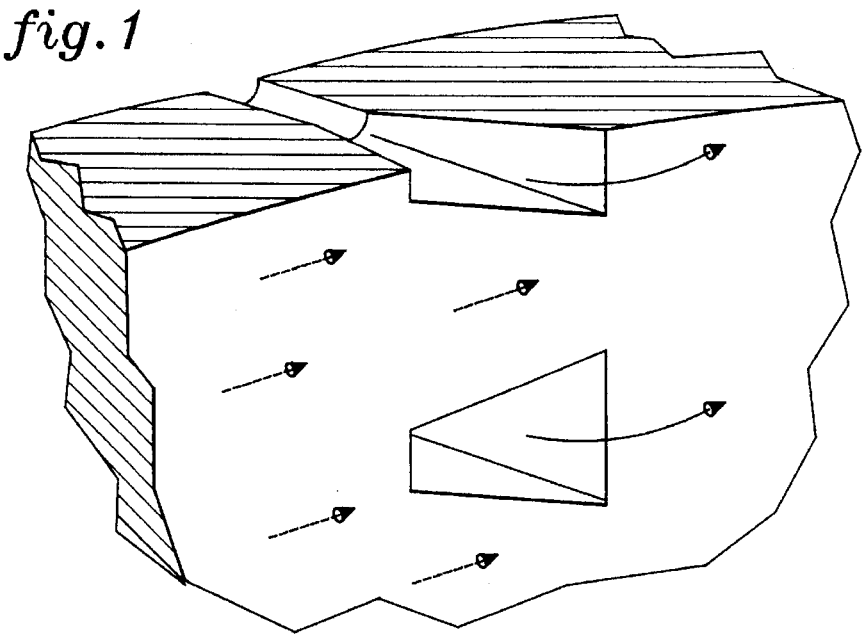
FIG. 1 is a schematic view of a diffused hole.
Figure 2:
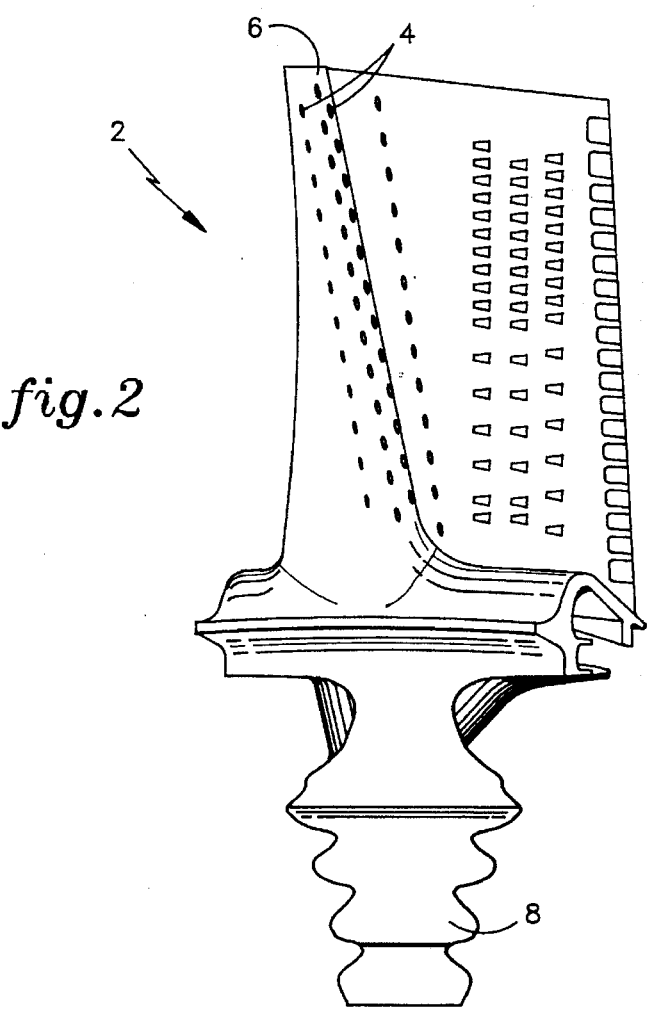
FIG. 2 is a perspective view of a turbine blade.

FIG. 2 shows a typical hollow turbine blade 2 (work piece) with diffusion holes 4 at the blade's convex surface 6. The blade 2 includes a root 8, wherein cooling air enters the internal cavity of the blade 2 through an opening in the root 8. This air cools the internal surface of the blade 2 by convection and cools the outer surface of the blade 2 by film cooling. To permit film cooling, a plurality of diffusion holes 4 are placed on the convex surface 6 of the blade 2.

As shown in FIG. 3 and FIG. 4, the multiple piece electrode 14 comprises a plurality of three-dimensional shaped teeth 18 which form a "comb like" structure. Although a single tooth may be used, a plurality of teeth 18 will usually be more cost effective. The teeth 18 are made out of copper since it is relatively inexpensive and easy to stamp and coin into a desired shape.

A plurality of rods 22, are positioned inside the teeth 18, one for each tooth. As shown in FIG. 5, it is desirable to produce a diffusion hole with an angle of about ten (10) degrees because diffusion hole angles significantly greater than that may result in undesirable turbulent airflow. The rods 22 have a diameter between about 0.006 inches and 0.010 inches because small diameter metering areas are desired for efficient cooling. The rods 22 are made of tungsten because tungsten exhibits better wear properties than copper during the EDM process. The rods 22 and teeth 18 are secured together by a mechanism attached to the processing equipment, such as a clamping mechanism 24 shown in FIG. 6. Additionally, the present invention includes a refeed system for the rods 22 which positions the rods 22 to a desired length. When the electrode 14 is longitudinally advanced into the blade 2, the rods 22 cause a deep, small diameter holes 4 in the blade 2 and the teeth 18 cause conical areas at one end of the holes 4. The teeth 18 are placed in close proximity to the blade 2 to form a gap across which an electric current may be transmitted to erode a portion of the blade 2.

The present invention offers several advantages over existing technology. For example, the rods 22 may be made from a material other than that used for the teeth 18. As a result, cost effective, deeper holes with a metering section diameter of about 0.010 inches are possible at a depth in excess of about 0.250 inches. This is a significant improvement over the prior art which has a metering section diameter limit of about 0.014 inches with a 0.250 inch depth limit using the above described copper electrode.

While the principles and procedures are described herein for use on a turbine blade 2, it will be obvious to those skilled in the art that the same principles and procedures could be applied to other surfaces of additional articles requiring diffusion holes.

Although this invention has been shown and described with respect to detailed embodiments thereof, it will be understood by those skilled in the art that various changes, omissions and additions in form and detail thereof may be made without departing from the spirit and scope of the claimed invention.

We claim:

1. A method of forming diffusion holes in a superalloy article by electrical discharge machining comprising the steps of:

(a) inserting into an electrical discharge machining device a multiple piece electrode comprising (i) at least one tooth, wherein said at least one tooth is placed in close proximity to the superalloy article to form a gap across which an electric charge may be transmitted to erode a portion of the superalloy article, (ii) at least one movable, elongated rod, wherein said at least one movable, elongated rod is positioned through said at least one tooth, and (iii) means for securing said at least one movable, elongated rod to said at least one tooth, (b) advancing the multiple piece electrode longitudinally into the superalloy article such that said at least one movable, elongated rod forms a metering section hole in the superalloy article of about 0.010 inches in diameter at a depth in excess of about 0.250 inches and said at least one tooth forms a diffused area, with an angle of about 10 degrees, at one end of the hole.

2. The method of claim 1 further comprising the step of rotating said at least one movable, elongated rod.

3. The method of claim 1, wherein said at least one movable, elongated rod is hollow and a dielectric fluid is flowed through said at least one movable, elongated rod.

4. The method of claim 1 further comprising a refeed system which positions said at least one movable, elongated rod to a desired length, wherein the refeed system includes an electrode length master which is positioned in front of the electrode.

5. The method of claim 1 wherein step b includes:

(i) advancing said at least one tooth longitudinally into the superalloy article such that said at least one tooth electrically discharge machines a diffused area at one end of the hole, and then (ii) advancing said at least one movable, elongated rod longitudinally into the superalloy article such that said at least one movable, elongated rod electrically discharge machines a deep small, diameter metering section from the diffused area into the superalloy article.

6. The method of claim 5 further comprising the step of rotating said at least one movable, elongated rod.

7. The method of claim 5, wherein said at least one movable, elongated rod is hollow, further comprising the step of passing a dielectric fluid through said at least one movable elongated rod.

* * * * *